United States Patent
Tierney et al.

(10) Patent No.: US 7,143,245 B2
(45) Date of Patent: Nov. 28, 2006

(54) SYSTEM AND METHOD FOR READ MIGRATORY OPTIMIZATION IN A CACHE COHERENCY PROTOCOL

(75) Inventors: Gregory Edward Tierney, Chelmsford, MA (US); Stephen R. Van Doren, Northborough, MA (US); Simon C. Steely, Jr., Hudson, NH (US)

(73) Assignee: Hewlett-Packard Development Company, L.P., Houston, TX (US)

(*) Notice: Subject to any disclaimer, the term of this patent is extended or adjusted under 35 U.S.C. 154(b) by 469 days.

(21) Appl. No.: 10/761,044

(22) Filed: Jan. 20, 2004

(65) Prior Publication Data

US 2005/0160236 A1    Jul. 21, 2005

(51) Int. Cl.
*G06F 12/00* (2006.01)

(52) U.S. Cl. .................................. 711/144; 711/146

(58) Field of Classification Search ............... None
See application file for complete search history.

(56) References Cited

U.S. PATENT DOCUMENTS

| | | | |
|---|---|---|---|
| 5,802,577 A | 9/1998 | Bhat et al. | |
| 5,829,040 A | 10/1998 | Son | |
| 5,875,467 A | 2/1999 | Merchant | |
| 5,875,472 A | 2/1999 | Bauman et al. | |
| 5,958,019 A | 9/1999 | Hagersten et al. | |
| 6,055,605 A | 4/2000 | Sharma et al. | |
| 6,085,263 A | 7/2000 | Sharma et al. | |
| 6,108,737 A | 8/2000 | Sharma et al. | |
| 6,272,602 B1* | 8/2001 | Singhal et al. ............... 711/144 |
| 6,345,342 B1 | 2/2002 | Arimilli et al. | |
| 6,457,100 B1 | 9/2002 | Ignatowski et al. | |
| 6,490,661 B1 | 12/2002 | Keller et al. | |
| 6,631,401 B1 | 10/2003 | Keller et al. | |
| 6,745,272 B1* | 6/2004 | Owen et al. ................. 710/107 |
| 2001/0034815 A1 | 10/2001 | Dungan et al. | |
| 2002/0009095 A1 | 1/2002 | Van Doren et al. | |
| 2002/0073071 A1 | 6/2002 | Pong et al. | |
| 2003/0018739 A1 | 1/2003 | Cypher et al. | |
| 2003/0140200 A1 | 7/2003 | Jamil et al. | |
| 2003/0145136 A1 | 7/2003 | Tierney et al. | |
| 2003/0195939 A1 | 10/2003 | Edirisooriya et al. | |
| 2003/0200397 A1 | 10/2003 | McAllister et al. | |
| 2004/0068624 A1* | 4/2004 | Van Doren et al. ......... 711/147 |
| 2005/0251626 A1* | 11/2005 | Glasco ........................ 711/133 |

OTHER PUBLICATIONS

Chen et al., "Write Caching in Distributed File Systems", Distributed Computing Systems, 1995., Proceedings of the 15th International Conference, May 30-Jun. 2, 1995 pp. 457-466 □□.*

(Continued)

*Primary Examiner*—Mano Padmanabhan
*Assistant Examiner*—Paul Baker (57) ABSTRACT

A system comprises a first node including data having an associated D-state and a second node operative to provide a source broadcast requesting the data. The first node is operative in response to the source broadcast to provide the data to the second node and transition the state associated with the data at the first node from the D-state to an O-state without concurrently updating memory. An S-state is associated with the data at the second node.

31 Claims, 4 Drawing Sheets

OTHER PUBLICATIONS

Archibald et al., "Cache coherence protocols: evaluation using a multiprocessor simulation model", Nov. 1986, ACM Transactions on Computer Systems, pp. 273-298.*

Handy, "The Cache Memory Book", 1998, pp. 64-67.*

Rajeev, Joshi, et al., "Checking Cache-Coherence Protocols with TLA+", Kluwer Academic Publishers, 2003, pp. 1-8.

Martin, Milo M.K., et al., "Token Coherence: Decoupling Performance and Correctness", ISCA-30, pp. 1-12, Jun. 9-11, 2003.

Acacio, Manuel E., et al., "Owner Prediction for Accelerating Cache-to-Cache Transfer Misses in a cc-NUMA Architecture", IEEE 2002.

Gharachorloo, Kourosh, et al., "Architecture and Design of AlphaServer GS320", Western Research Laboratory, date unknown.

Gharachorloo, Kourosh, et al., "Memory Consistency and Event Ordering In Scalable Shared-Memory Multiprocessors", Computer Systems Laboratory, pp. 1-14, date unknown.

* cited by examiner

SYSTEM AND METHOD FOR READ MIGRATORY OPTIMIZATION IN A CACHE COHERENCY PROTOCOL

RELATED APPLICATIONS

This application is related to the following commonly assigned co-pending patent applications entitled:
"CACHE COHERENCY PROTOCOL WITH ORDERING POINTS," Ser. No. 10/760,640; "SYSTEM AND METHOD FOR RESOLVING TRANSACTIONS IN A CACHE COHERENCY PROTOCOL," Ser. No. 10/760,813; "SYSTEM AND METHOD TO FACILITATE ORDERING POINT MIGRATION," Ser. No. 10/761,048; "SYSTEM AND METHOD TO FACILITATE ORDERING POINT MIGRATION TO MEMORY," Ser. No. 760,599; "SYSTEM AND METHOD FOR CREATING ORDERING POINTS," Ser. No. 10/760,652; "SYSTEM AND METHOD FOR CONFLICT RESPONSES IN A CACHE COHERENCY PROTOCOL WITH ORDERING POINT MIGRATION," Ser. No. 10/760,651; "SYSTEM AND METHOD FOR BLOCKING DATA RESPONSES," Ser. No. 10/761,034; "SYSTEM AND METHOD FOR NON-MIGRATORY REQUESTS IN A CACHE COHERENCY PROTOCOL," Ser. No. 10/760,659; "SYSTEM AND METHOD FOR CONFLICT RESPONSES IN A CACHE COHERENCY PROTOCOL WITH ORDERING POINT MIGRATION," Ser. No. 10/761,073; "SYSTEM AND METHOD FOR CONFLICT RESPONSES IN A CACHE COHERENCY PROTOCOL," Ser. No. 10/761,047; "SYSTEM AND METHOD FOR RESPONSES BETWEEN DIFFERENT CACHE COHERENCY PROTOCOLS," Ser. No. 10/760,436, all of which are filed contemporaneously herewith and are incorporated herein by reference.

BACKGROUND

Multiprocessor systems employ two or more computer processors that can communicate with each other, such as over a bus or a general interconnect network. In such systems, each processor may have its own memory cache (or cache store) that is separate from the main system memory that the individual processors can access. Cache memory connected to each processor of the computer system can often enable fast access to data. Caches are useful because they tend to reduce latency associated with accessing data on cache hits, and they work to reduce the number of requests to system memory. In particular, a write-back cache enables a processor to write changes to data in the cache without simultaneously updating the contents of memory. Modified data can be written back to memory at a later time.

Coherency protocols have been developed to ensure that whenever a processor reads a memory location, the processor receives the correct or true data. Additionally, coherency protocols help ensure that the system state remains deterministic by providing rules to enable only one processor to modify any part of the data at any one time. If proper coherency protocols are not implemented, however, inconsistent copies of data can be generated.

There are two main types of cache coherency protocols, namely, a directory-based coherency protocol and a broadcast-based coherency protocol. A directory-based coherency protocol associates tags with each memory line. The tags can contain state information that indicates the ownership or usage of the memory line. The state information provides a means to track how a memory line is shared. Examples of the usage information can be whether the memory line is cached exclusively in a particular processor's cache, whether the memory line is shared by a number of processors, or whether the memory line is currently cached by any processor.

A broadcast-based coherency protocol employs no tags. Instead, in a broadcast-based coherency protocol, each of the caches monitors (or snoops) requests to the system. The other caches respond by indicating whether a copy of the requested data is stored in the respective caches. Thus, correct ownership and usage of the data are determined by the collective responses to the snoops.

SUMMARY

One embodiment of the present invention may comprise a system that includes a first node including data having an associated dirty (D) state. A second node is operative to provide a source broadcast requesting the data, the first node being operative in response to the source broadcast to provide the data to the second node and to transition the state associated with the data at the first node from the D-state to an owner (O) state without concurrently updating memory. A shared (S) state is associated with the data at the second node.

Another embodiment of the present invention may comprise a multiprocessor network that includes memory for storing data. A plurality of processor nodes are in communication with each other and with the memory. A first processor node of the plurality of processor nodes includes data in a cache line having an associated dirty state. A second processor node of the plurality of processor nodes is operative to provide a source broadcast read request to obtain the data. The first processor node is programmed to respond to the source broadcast read request of the second processor node by providing a shared data response to the second processor node and transitioning the data in the cache line from the dirty state to an owner state without concurrently updating the memory with the data. The data is stored in a cache line at the second processor node associated with a shared state.

Another embodiment of the present invention may comprise a computer system that includes a source processor having an associated cache. The source processor is operative to issue a source broadcast request for data. Memory stores the data. A target processor has an associated cache with a cache line that includes the data, the cache line having an associated dirty (D) state. The target processor is programmed to (i) when not writing the data in the cache line of the target processor, respond to the source broadcast request by providing a shared data response to the source processor and by transitioning the state of the data in the cache line from the D-state to an owner (O) state without concurrently updating the memory, and (ii) programmed to transition the state of the data in the cache line from the D-state to a modified (M) state in connection with writing the data in the cache line of the target processor. The first processor node being operative while in the M-state to respond to the source broadcast request by providing an ownership data response to the another processor node and by transitioning the state of the data in the cache line from the M-state to an invalid (I) state without updating the memory.

Yet another embodiment of the present invention may comprise a method that includes broadcasting a request for data from a first node to other nodes of an associated system. The state associated with the data at the second node transitions from a dirty (D) state to an owner (O) state data without concurrently updating memory if the second node does not require to modify the data. The request broadcast from the first node is responded to by providing a response from a second node that includes a shared copy of the data. The state associated with the data at the first node transitions to a shared (S) state in response to receiving the response from the second node.

Still another embodiment of the present invention may comprise a computer system including a cache coherency protocol that is operative to permit read migration of data to a cache associated with a source processor from a cache associated with a target processor when the data is written to the cache associated with the target processor. The protocol is further operative to prevent read migration of the data to the cache associated with the source processor from the cache associated with the target processor when the data is not written to the cache associated with the target processor.

DETAILED DESCRIPTION

This disclosure relates generally to a coherency protocol that includes a modified cache state (M-state) and an exclusive cache state (E-state) and supports the migration of read data. The protocol employs a dirty state (D-state) and an owner-shared state (O-state) to, under certain circumstances, enable read migration without write-back to memory, which can help reduce memory bandwidth requirements. Under other circumstances, the protocol also provides for write-back to memory, which helps prevent perpetual data migration. The implementation of the D-state and O-state is useful in multiprocessor systems employing a broadcast-based protocol, as well as a hybrid cache coherency protocol, such as a broadcast snoop-based protocol implemented in conjunction with a directory-based protocol.

Figure 1:
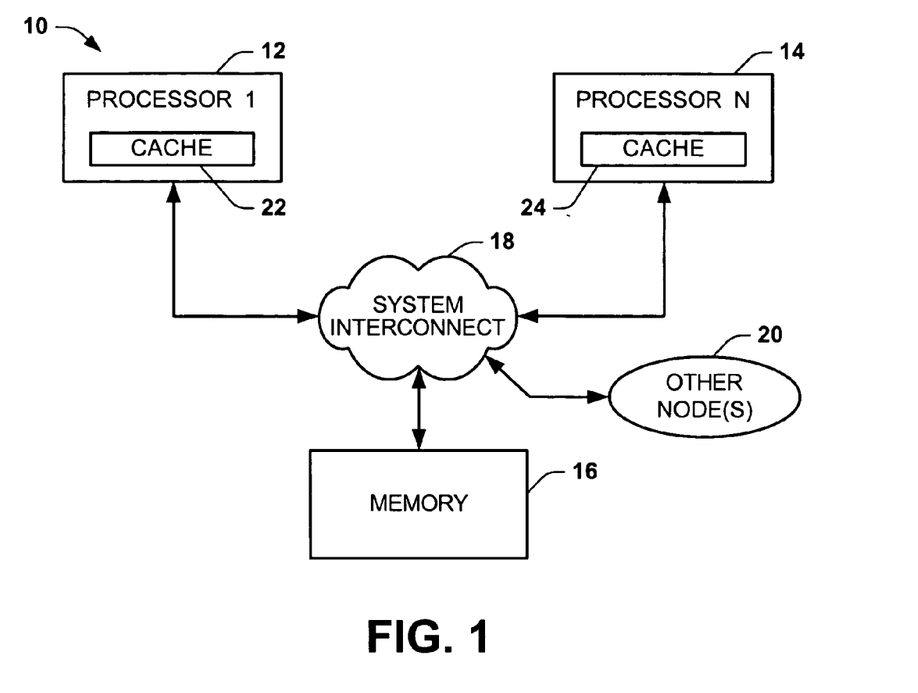
FIG. 1 depicts an example of a multiprocessor system.

FIG. 1 depicts an example of a system 10 in which a cache coherency protocol of the present invention may be implemented in order to provide read migratory optimization. The system 10 illustrates a multi-processor environment that includes a plurality of processors 12 and 14 (indicated at PROCESSOR 1 through PROCESSOR N, where N is a positive integer (N>1)). The system 10 also includes memory 16, which can be implemented as a globally accessible aggregate memory. For example, the memory 16 can include one or more memory storage devices (e.g., dynamic random access memory (DRAM)).

The processors 12 and 14 and memory 16 define nodes in the system that can communicate with each other via requests and corresponding responses through a system interconnect 18. For example, the system interconnect 18 can be implemented as a switch fabric or a hierarchical switch. Also associated with the system 10 can be one or more other nodes, indicated schematically at 20. The other nodes 20 can correspond to one or more other multiprocessor systems connected to the system interconnect 18, such as through an appropriate interconnect interface (not shown).

Each of the processors 12 and 14 includes at least one corresponding cache 22 and 24. For purposes of brevity, each of the respective caches 22 and 24 is depicted as unitary memory devices, although the caches may include a plurality of memory devices or different cache levels. Each of the caches 22 and 24 includes a plurality of cache lines. Each cache line has an associated address that identifies corresponding data stored in the line. The cache lines can also include information identifying the state of the data for the respective lines.

The system 10 thus employs the caches 22 and 24 and the memory 16 to store blocks of data, referred to herein as "memory blocks." A memory block can occupy part of a memory line, an entire memory line or span across multiple lines. For purposes of simplicity of explanation, however, it will be assumed that a "memory block" occupies a single "memory line" in memory or a "cache line" in a cache. Additionally, a given memory block can be stored in a cache line of one or more caches as well as in a memory line of the memory 16.

The system 10 implements a cache coherency protocol to manage the sharing of memory blocks so as to help ensure coherence of data. The cache coherency protocol of the system 10 utilizes a plurality of states to identify the state of each memory block stored in respective cache lines of the caches 22 and 24 and the memory 16. The coherency protocol establishes rules for transitioning between states, such as if data is read from or written to memory 16 or one of the caches 22 and 24.

As used herein, a node that issues a request, such as a read or write request, defines a source node. Other nodes within the system 10 are potential targets of the request. Additionally, each memory block in the system 10 can be assigned a "home node" that maintains necessary global information and a data value for that memory block.

For example, when a source node, such as the processor 12, requires a copy of a given memory block, the source node typically first requests the memory block from its local, private cache by identifying the address associated with the memory block. If the data is found locally, the memory access is resolved without communication via the system interconnect 18. When the requested memory block is not found locally, the source node 12 can request the memory block from the system 10, including the memory 16. In addition to the request identifying an address associated with the requested memory block, the request usually identifies the type of request or command being issued by the requester. Whether the other nodes 14 and the memory 16 will return a response depends upon the type of request, as well as the state of the identified memory block contained in the responding nodes. The protocol implemented by the system 10 defines the available states and possible state transitions.

A set of cache states that can be implemented by the system 10 for a respective cache line is depicted below in Table 1. Since there are six possible states, the state information can be encoded by a three-bit data word, for example.

TABLE 1

| STATE | DESCRIPTION |
|---|---|
| I | Invalid - The cache line does not exist. |
| S | Shared - The cache line is valid and unmodified by caching processor. Other processors may have valid copies, and the caching processor cannot respond to snoops by returning data. |
| E | Exclusive - The cache line is valid and unmodified by caching processor. The caching processor has the only cached copy in the system and may respond to snoops by returning data. |
| D | Dirty - The cache line is valid and more up-to-date than memory. The cache line has not been modified by the caching processor, and the caching processor has the only cached copy in the system. The caching processor must respond to snoops by returning data and must write data back to memory upon displacement. The dirty state permits a modified block to be transferred between caches without updating memory. |
| M | Modified - The cache line is valid and has been modified by the caching processor. The caching processor has the only cached copy in the system, and the caching processor must respond to snoops by returning data and must write data back to memory upon displacement. |
| O | Owned - The cache line is valid and more up-to-date than memory. The caching processor cannot modify the cache line. Other processors may have valid copies, and the caching processor must respond to snoops by returning data and must write data back to memory upon displacement. |

As mentioned above, copies of the same data can exist in cache lines of different processor nodes 12 and 14. Shared copies of a memory block can co-exist in different caches of the system in the S-state. With the protocol employing the states defined in Table 1, the cache containing a cache line in the S-state cannot respond to requests by returning data associated with the cache line. Instead, a node containing data in an S-state can respond to a request by returning a non-data shared response, indicating that the cache contains a shared copy of data, and the data can remain in the S-state. Since a cache line in the S-state contains data unmodified from that stored in memory, a cache line in the S-state may be silently evicted.

An exclusive copy of a memory block can exist only at a single cache of the system in the E-state. A cache 22 and 24 containing a cache line in the E-state can respond to requests by returning data associated with the cache line. Since a cache line in the E-state contains data that is unmodified from that stored in memory, a cache line in the E-state can be silently evicted.

A modified copy of a memory block can exist only at a single cache of the system in the M-state. The M-state provides write permission to the processor for writing to a cache line in the M-state. A processor that includes a cache line in the M-state can respond to requests by returning data associated with the cache line. Since, by definition, M-state data can be modified from that stored in the memory 16, and thus may be more up-to-date than memory, write-back is required upon displacement of M-state data.

The inclusion of the D-state and O-state in the cache coherency protocol allows for migration of data, without write-back, when requested from a cache containing the data in the M-state. By way of example, assume that the processor 12 (a source node) requires a copy of data associated with a particular address, and assume that the data is unavailable from its own local cache 22. Since the processor 12 does not contain a copy of the requested data, the processor initially has an I-state (invalid) associated with the data. Since the processor 12 is unable to access the data in its local cache 22, the processor 12, as the source node, transmits a source broadcast request to other nodes and memory 16 via the system interconnect 18.

The source node 12 request can correspond to a source broadcast read request (ownership or non-ownership) for a memory block associated with the address identified in the request. For an ownership request, the source node 12 requester requires the ability to modify the requested data. For a non-ownership request, the source node 12 requester does not require the ability to modify the requested data.

In this example, the broadcast request is transmitted from the source processor 12 to all other processors 14 in the system 10, including those located in the other nodes 20, as well as to the memory 16. In this example, it is assumed that, at the time of the request, another processor (e.g., processor 14) in the system 10 includes a modified copy of the requested data in an M-state cache line of its cache 24. Thus, the target processor 14 provides a response that includes a copy of the requested data to the source processor 12. The target processor 14 also transitions the cache line from the M-state to the I-state.

Upon receiving the data from the target processor 14, the source processor 12 places the data in the appropriate cache line in its cache 22. The source processor 12 transitions this cache line from the I-state to the D-state. In the D-state, the source processor 12 has the most up-to-date version of the data stored in its cache 22 and has not modified the data (e.g., by writing to the cache line). The data has thus migrated from the target processor 14 to the source processor 12 without write-back to (updating) the memory 16.

Continuing with the above example, assume that a processor (e.g., processor 14) requests the data stored in the D-state in cache 22 of processor 12, as may occur after the read migration described above. The source processor 14 issues a broadcast request that is transmitted to all other processors in the system 10, including the target processor 12 and those located in the other nodes 20, as well as to the memory 16. If the target processor 12 has not modified (e.g., written) the data, the target processor responds by providing a shared data response to the source processor 14 and transitioning its cache line associated with the data from the D-state to the O-state. The source processor 14 receives the requested data and places the requested data in the appropriate cache line in its cache 24. The source processor 14 transitions this cache line from the I-state to the S-state because, at this point, an up-to-date copy of the data is shared by both the source processor 14 (S-state) and the target processor 12 (O-state).

In the S-state, the source processor 14 has a valid and unmodified copy of the data. Since other processors may have valid copies of the data, the source processor 14 (being in the S-state) cannot respond to snoops by returning data and cannot write-back the data to memory 16. In the O-state, the target processor 12 has the most up-to-date version of the data stored in its cache 22. The target processor 12 cannot modify the data, and must write-back the data to memory 16 upon displacement (e.g., upon a write request or invalidate issued by another node). The target processor 12, being in the O-state, can respond to read requests by returning shared data, and thus may respond to subsequent read requests from other processors.

Continuing with the above example, as an alternative, assume that a processor (e.g., processor 12) requests the data stored in the D-state in cache 24 of processor 14, as may occur after the read migration described above. The source processor 12 issues a broadcast request that is transmitted to all other processors in the system 10, including the target processor 14 and those located in the other nodes 20, as well as to the memory 16. In this example, however, assume that the target processor 14 has modified the data and thus has written the data to the associated cache line of the target processor and has transitioned the cache line from the D-state to the M-state. In response to receiving the request broadcast from the source processor 12, the target processor, having the M-state associated with the cache line for the requested data, provides an ownership data response to the source processor 12 and transitions the cache line from the M-state to invalid (I-state). The source processor 12 receives the data, places the data in the appropriate cache line of cache 22, and transitions the cache line to the D-state.

The source processor 12, having a D-state associated with the data, has the most up-to-date version of the data stored in its cache 22, and has not modified the data. The data has thus migrated from the target processor 14 to the source processor 12 without write-back to memory 16. The data, being in the D-state in the source processor 12, may thus be subject to further migration, such as where the source processor writes the data and transitions its associated cache line from the D-state to the M-state. Alternatively, further migration of the D-state data can be precluded, such where the source processor does not write the data and transitions the source processor cache line from the D-state to the O-state in response to a broadcast snoop request for the data.

As illustrated by the examples set forth above, those skilled in the art will appreciate that the D-state, in conjunction with the O-state, provides migration of data without write-back only in the situation where the target processor writes the data. Put another way, whether the data migrates or whether the data inevitably writes back to memory depends on whether the target processor writes the data. If the data is written by the target processor, the data migrates to the source processor, assumes a D-state in the cache line of the source processor, and is subject to future migration and/or write-back. If the data is not written by the target processor, the target processor transitions to the O-state and a shared copy is sent to the source processor, which transitions its associated cache line to the S-state, and the data is inevitably written back to memory.

The migration of the data without write-back to memory, depending on whether the target processor writes the data, can be beneficial in some specific program or data flow scenarios that may occur in the system 10. In one scenario, processors may read and modify (write) certain data frequently. In this multiple writing processor scenario, since the data can be written relatively frequently by the processors, the D-state can be implemented as described herein and data migrates from processor to processor without frequent memory updates. In another scenario, processors may read certain data frequently, without modifying the data. In this multiple reading processor scenario, since the processors do not write the data, the O-state can be implemented as described herein and the data is shared by the processors.

Figure 2:
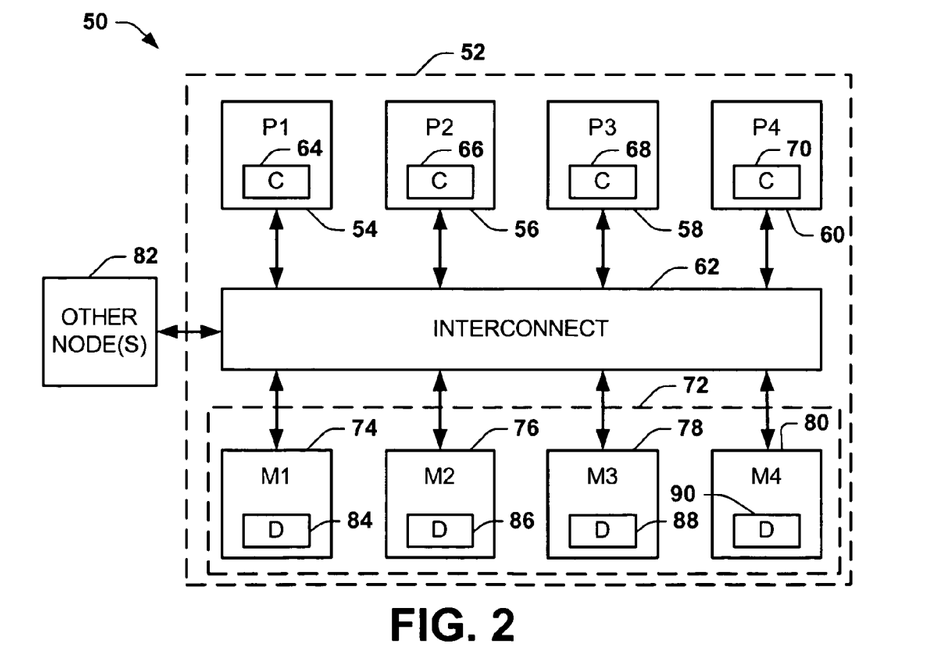
FIG. 2 depicts an example of another multiprocessor system.

FIG. 2 depicts an example of a multiprocessor computing system 50. The system 50, for example, includes an SMP (symmetric multi-processor) node 52 that includes processors (P1, P2, P3, P4) 54, 56, 58 and 60 in communication with each other via an interconnect 62. The interconnect 62 facilitates transferring data between processors and memory of the system 50. While four processors 54, 56, 58, and 60 are depicted in the example of FIG. 2, those skilled in the art will appreciate that a greater or smaller number of processors can be implemented in the node 52.

Each processor 54, 56, 58, and 60 also includes an associated cache 64, 66, 68 and 70. The caches 64, 66, 68, and 70 can enable faster access to data than from an associated main memory 72 of the node 52. The system 50 implements a cache coherency protocol designed to guarantee coherency of data in the system. By way of example, the cache coherency protocol can be implemented to include a source broadcast protocol in which broadcast snoops or requests for data are transmitted directly from a source processor to all other processors and memory in the system 50. The source broadcast protocol can further be implemented in conjunction with another forward progress protocol, such as a null-directory or other directory-based protocol. The system 50 of FIG. 2, for example, employs the source broadcast protocol to process a request for data. If the request cannot be processed using the source broadcast protocol, such as where a conflict exists, the system 50 transfers to its forward progress protocol.

The memory 72 can include multiple memory modules (M1, M2, M3, M4) 74, 76, 78 and 80. For example, the memory 72 can be organized as a single address space that is shared by the processors 54, 56, 58 and 60 as well as other nodes 82 of the system 50. Each of the memory modules 74, 76, 78 and 80 can include a corresponding directory 84, 86, 88 and 90 that defines where the corresponding coherent copy of the data should reside in the system 50. Alternatively, the memory modules may contain no directories. A coherent copy of data, for example, may reside in a home node (e.g., associated with a given memory module) or, alternatively, in a cache of one of the processors 54, 56, 58 and 60.

The other node(s) 82 can include one or more other SMP nodes associated with the SMP node 52 via the interconnect 62. For example, the interconnect 62 can be implemented as a switch fabric or hierarchical switch programmed and/or configured to manage transferring requests and responses between the processors 54, 56, 58, and 60 and the memory 70, as well as those to and from the other nodes 82.

When a processor 56 requires desired data, the processor 56 operates as a source and issues a source broadcast snoop (e.g., a broadcast read or broadcast write request) to all other processors 54, 58 and 60 as well as to memory 72 via the interconnect 62. The cache coherency protocol implemented in the system 50 is designed to ensure that a correct copy of the data is returned in response to the source broadcast snoop.

For example, if a source processor 56 broadcasts a snoop request via the interconnect 62, one of the responses received from the other processors 54, 58 and 60 may indicate that the data exists in one of the other caches (e.g., target processor 58) as modified (M-state) data. If the data exists in one of the other caches as modified data, the responses from the other processors 54 and 60 are non-data responses indicating that a valid copy of the requested data does not exist at those processors. When these non-data responses occur, the data migrates from the target processor 58 to the source processor 56, which results in the cache line of cache 66 receiving the requested data and transitioning to the D-state. The cache line of the target processor 58 transitions from the M-state to I-state. The requested data has thus migrated from the target processor 58 to the source processor 56 without write-back to memory 72. With the cache 66 maintaining a D-state cache line for the data received from memory, the processor 56 can now respond to requests for the data by issuing a response that includes a copy of the data to one or more requesting processors 54, 58 or 60 (e.g., the processor 56 may now become a target processor). The target processor 58 thus provides a response to the source processor 56 depending on the state of the target processor upon receipt of the request.

In a first case, it is assumed that the target processor 56 writes the data and thus transitions its cache line associated with the data to the M-state. If source processor 60 broadcasts a snoop request for the data, the source processor will receive a data response from target processor 56. The other processors 54 and 58 will provide non-data responses indicating that a valid copy of the requested data does not exist in the caches of those processors. The target processor 56, maintaining an M-state cache line for the data, provides a data response to source processor 60, without write-back, and invalidates its associated cache line (transitions its cache line from the M-state to the invalid state (I-state)). In response to receiving the response from the target processor 56, the source processor 60 stores the data in an associated cache line and transitions the state associated with the cache line to the D-state. Thus, in this example, the data migrates from the target processor 56 to the source processor 60 without write-back to memory. From this point, further migration may occur in accordance with this paragraph, or migration may cease, depending on whether the processor 60 writes the data, as described above.

In a second case, it is assumed that the processor 56 does not write the data and thus maintains the cache line associated with the data in the D-state. If the source processor 60 broadcasts a snoop request for the D-state data to the system 50, the other processors 54 and 58 will provide non-data miss responses indicating that a valid copy of the requested data does not exist in the caches of those processors. Since the target processor 56 includes the D-state data, the target processor responds by providing a shared data response to the source processor 60 and by transitioning its associated cache line from the D-state to the O-state. The source processor 60 receives the requested data and places the requested data in the appropriate cache line of the source processor cache 70. The source processor 60 transitions this cache line from the I-state to the S-state and, thus, an up-to-date copy of the data is shared by both the source processor 60 (S-state) and the target processor 56 (O-state). The data can be shared with subsequent requesting (source) processors by the target processor 56 providing shared copies of the data, but the recipients of the shared data cannot migrate the data further. Eventually, when the O-state data is evicted from the target processor 56, the data will be written-back to memory 72.

Figure 3:
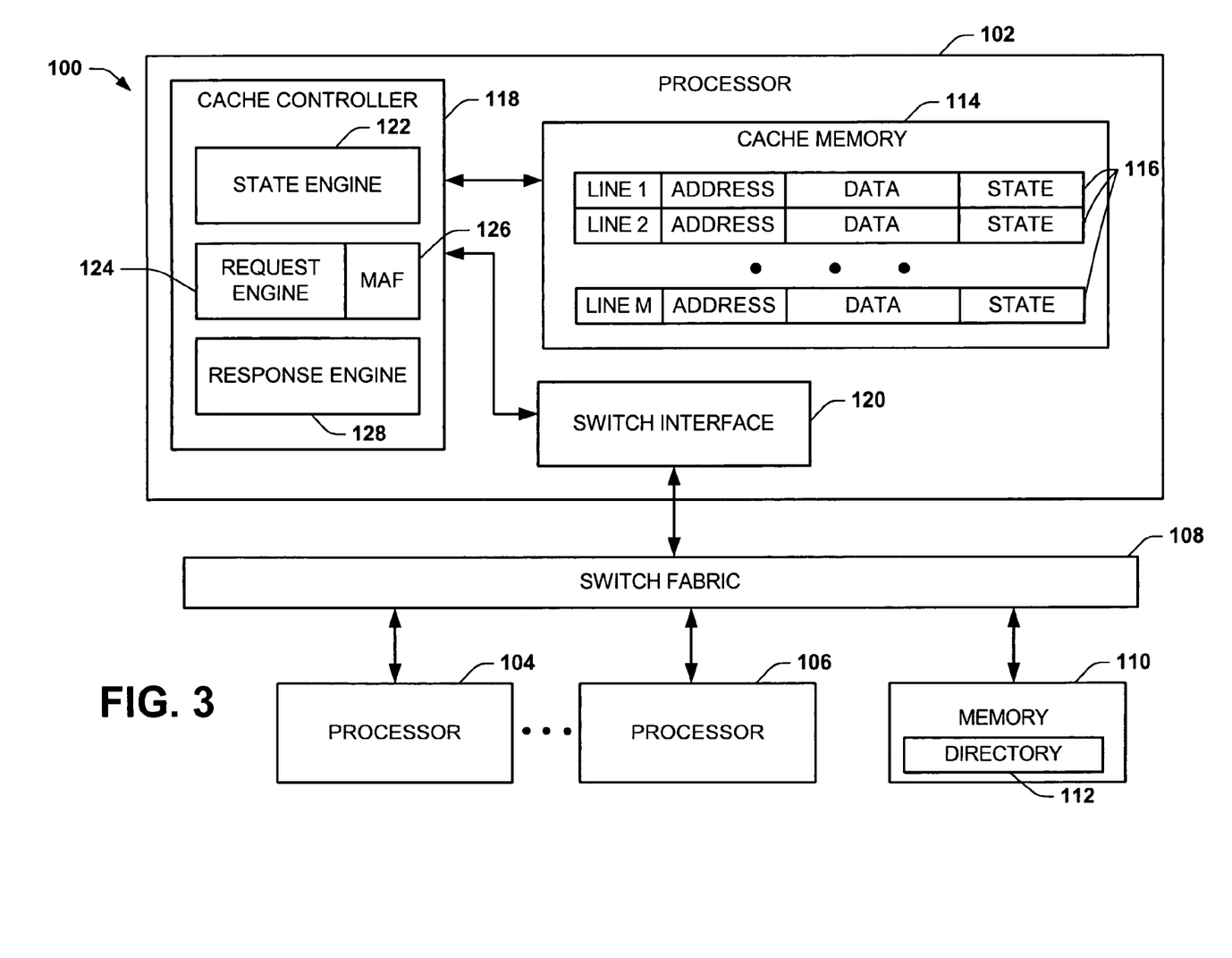
FIG. 3 depicts an example of a processor within a multiprocessor system.

FIG. 3 depicts an example of another multi-processor system 100 that includes a plurality of processors 102, 104 and 106 in communication with each other via a switch fabric 108. The system 100 also includes associated memory 110, which can be organized as a single address space that is shared by the processors 102, 104, and 106. Alternatively, the memory 110 can be implemented as a plurality of separate memory modules associated with each of the respective processors 102, 104, and 106 for storing data. The system 100, for example, can be implemented as an integrated circuit or as circuitry containing plural integrated circuits.

The system 100 can employ a source broadcast or source-snoopy cache coherency protocol. For this type of protocol, a source processor 102, 104, and 106 can issue a source broadcast request to all other processors in the system and to the memory 110. In the event that conflict arises, or the source broadcast request otherwise fails, the system 100 can transfer to a forward-progress protocol, such as a null-directory or other directory-based protocol.

In a null-directory protocol, for example, the memory 110 employs a corresponding directory 112 to ascertain a home for a requested data. Instead of issuing a broadcast to all cache targets, the source issues a single request to the home of such data. In response to receiving the request for memory, the home processor can respond with the data to the requesting processor; although only after the home processor sends snoop messages to (and receives responses from) all other processors. In a standard directory protocol, there will be times when the directory can indicate that there are no cached copies, and thus the home processor can respond with the data without issuing any snoops to the system. Those skilled in the art will appreciate that, when successful, a snoop broadcast protocol can be implemented with decreased latency relative to the null directory protocol or directory-based protocols. Thus, by combining the two protocols, the system 100 operates in a more robust and efficient manner, as described herein.

The processor 102 includes cache memory 114 that contains a plurality of cache lines (e.g., lines 1-M, where M is a positive integer, $M \geq 1$) 116. Each cache line 116 can contain one or more memory blocks. An address (ADDRESS) is associated with the data contained in each cache line 116. Additionally, each cache line 116 can contain state information identifying the state of the data contained at that cache line. Examples of states that can be associated with each cache line 116 are identified above in Table 1.

A cache controller 118 is associated with the cache memory 114. The cache controller 118 controls and manages access to the cache memory, including requests for data and responses. The cache controller 118 communicates requests and responses via a switch interface 120 that is coupled with the switch fabric 108. The switch interface 120, for example, includes an arrangement of queues (e.g., input and output queues) or other data structures that organize both requests and responses issued by the processor 102 as well as requests and responses for execution by the processor.

In the example of FIG. 3, the cache controller 118 includes a state engine 122 that controls the state of each respective line 116 in the cache memory 114. The state engine 122 is programmed and/or configured to implement state transitions for the cache lines 116 based on predefined rules established by the cache coherency protocol implemented in the system 100. For example, the state engine 122 can modify the state of a given cache line 116 based on requests issued by the processor 102. Additionally, the state engine 122 can modify the state of a given cache line 116 based on responses received at the processor 102 for the given address, such as may be provided by another processor 104, 106 and/or the memory 110.

Examples of state transitions that can occur in the system 100 for selected processor commands are provided in Table 2. The commands beginning with the term "broadcast" generally correspond to broadcast snoop commands implemented within the context of the source broadcast protocol. Most of the other commands not beginning with the term "broadcast" are examples of typical commands that can be implemented within the context of the forward progress protocol, also implemented by the system 100.

TABLE 2

| Command | Current | | | Next | | | |
|---|---|---|---|---|---|---|---|
| | Source | Owner | Sharer | Source | Owner | Sharer | Memory |
| Broadcast read line code: Non-migratory read request | I | I | I | E or F | I | I | |
| | I | I | S | F | I | S | |
| | I | E | I | S | F | I | |
| | I | F | I | S | F | I | |
| | I | F | S | S | F | S | |
| | I | D | I | S | O | I | |
| | I | M | I | S | O | I | |
| | I | O | I | S | O | I | |
| | I | O | S | S | O | S | |
| Broadcast read line data: Migratory read request | I | I | I | E | I | I | |
| | I | I | S | F | I | S | |
| | I | E | I | S | F | I | |
| | I | F | I | S | F | I | |
| | I | F | S | S | F | S | |
| | I | D | I | S | O | I | |
| | I | M | I | D | I | I | |
| | I | O | I | S | O | I | |
| | I | O | S | S | O | S | |
| Broadcast non-coherent read | I | I | I | I | I | I | |
| | I | I | S | I | I | S | |
| | I | E | I | I | E | I | |
| | I | F | I | I | F | I | |
| | I | F | S | I | F | S | |
| | I | D | I | I | D | I | |
| | I | M | I | I | M | I | |
| | I | O | I | I | O | I | |
| | I | O | S | I | O | S | |
| Read line code: Non-migratory read request | I | I | I | E or S | I | I | |
| | I | I | S | S | I | S | |
| | I | E | I | S | S | I | |
| | I | F | I | S | S | I | |
| | I | F | S | S | S | S | |
| | I | D | I | S | S | I | Update |
| | I | M | I | S | S | I | Update |
| | I | O | I | S | S | I | Update |
| | I | O | S | S | S | S | Update |
| Read line data: Migratory read request | I | I | I | E | S | I | |
| | I | I | S | S | S | S | |
| | I | E | I | S | S | I | |
| | I | F | I | S | S | I | |
| | I | F | S | S | S | S | |
| | I | D | I | S | S | I | Update |
| | I | M | I | E | I | I | Update |
| | I | O | I | S | S | I | Update |
| | I | O | S | S | S | S | Update |
| Broadcast read modify with no update | I | I | I | E | I | I | |
| | I | I | S | E | I | I | |
| | I | E | I | E | I | I | |
| | I | F | I | E | I | I | |
| | I | F | S | E | I | I | |
| | I | D | I | D | I | I | |
| | I | M | I | D | I | I | |
| | I | O | I | D | I | I | |
| | I | O | S | D | I | I | |
| Broadcast upgrade | F | — | I | E | I | I | |
| | F | — | S | E | I | I | |
| | O | — | I | D | I | I | |
| | O | — | S | D | I | I | |
| Read modify with no update | I | I | I | E | I | I | |
| | I | I | S | E | I | I | |
| | I | E | I | E | I | I | |
| | I | F | I | E | I | I | |
| | I | F | S | E | I | I | |
| | I | D | I | E | I | I | Update |
| | I | M | I | E | I | I | Update |
| | I | O | I | E | I | I | Update |
| | I | O | S | E | I | I | Update |
| Upgrade unwritable copy | F | — | I | E | I | I | |
| | F | — | S | E | I | I | |
| | O | — | I | D | I | I | |
| | O | — | S | D | I | I | |
| | S | I | I | E | I | I | |
| | S | I | S | E | I | I | |
| | S | F | I | E | I | I | |
| | S | F | S | E | I | I | |

TABLE 2-continued

| Command | Current | | | Next | | | Memory |
|---|---|---|---|---|---|---|---|
| | Source | Owner | Sharer | Source | Owner | Sharer | |
| | S | O | I | E | I | I | Update |
| | S | O | S | E | I | I | Update |
| Invalidate line - no data | I | I | I | E | I | I | |
| | I | I | S | E | I | I | |
| | I | E | I | E | I | I | |
| | I | F | I | E | I | I | |
| | I | F | S | E | I | I | |
| | I | D | I | E | I | I | Update |
| | I | M | I | E | I | I | Update |
| | I | O | I | E | I | I | Update |
| | I | O | S | E | I | I | Update |
| | F | — | I | E | I | I | |
| | F | — | S | E | I | I | |
| | O | — | I | D | I | I | |
| | O | — | S | D | I | I | |
| | S | I | I | E | I | I | |
| | S | I | S | E | I | I | |
| | S | F | I | E | I | I | |
| | S | F | S | E | I | I | |
| | S | O | I | E | I | I | Update |
| | S | O | S | E | I | I | Update |
| Read modify with update | I | I | I | E | I | I | |
| | I | I | S | E | I | I | |
| | I | E | I | E | I | I | |
| | I | F | I | E | I | I | |
| | I | F | S | E | I | I | |
| | I | D | I | E | I | I | Update |
| | I | M | I | E | I | I | Update |
| | I | O | I | E | I | I | Update |
| | I | O | S | E | I | I | Update |
| Broadcast | D/M/O | — | I | I | I | I | Update |
| Victim write | D/M/O | — | S | I | I | S | Update |
| Victim write | D/M/O | — | I | I | I | I | Update |
| Victim | D/M/O | — | S | I | I | S | Update |

The cache controller 118 also includes a request engine 124. The request engine 124 employs a miss address file (MAF) 126 that contains MAF entries for outstanding requests associated with each line 116 of the cache memory 114. The MAF can be implemented as a table, an array, a linked list or other data structure programmed to manage and track requests for each cache line. For example, when the processor 102 requires data associated with a given address line 116, the request engine 124 creates a corresponding entry in the MAF 126. The MAF entry includes fields that identify, for example, the address of the data being requested, the type of request, and response information received from other nodes in response to the request. The request engine 124 thus employs the MAF 126 to manage requests issued by the processor 102 as well as responses to such requests.

The cache controller 118 also includes a response engine 128 that controls responses provided by the processor 102. The processor 102 provides responses to requests or snoops received via the switch interface 120 from another processor 104 and 106 or memory 110. The response engine 128, upon receiving a request from the system 100, cooperates with the state engine 122 and the MAF 126 to provide a corresponding response based on the type of request and the state of data contained in the cache memory 114. For example, if a MAF entry exists for an address identified in a request received from another processor or memory, the cache controller can implement appropriate conflict resolution defined by the coherency protocol. The response engine thus enables the cache controller to send an appropriate response to requesters in the system 100. A response to a request can also cause the state engine 122 to effect a state transition for an associated cache line 116.

By way of further example, assume that the processor 102 requires data not contained locally in its cache memory 114. The request engine 124 will create a MAF entry in the MAF 126, corresponding to the type of request and the address associated with data required. The cache controller 118 broadcasts a source snoop request to the system 100 via the switch interface 120 and switch fabric 108. The other processors 104 and 106 and memory 110 in the system 100 provide corresponding responses.

For example, if the processor 104 does not include a valid cache line associated with the data for the address identified in the read request, the processor returns a corresponding MISS response. As mentioned above, a MISS response can be provided by a target that does not contain a valid cache line for the requested data or if the target cache line contained a valid cache line, but was invalidated at the target (e.g., in response to the request). A home node (e.g., in the memory 110) can also provide a MISS response where the broadcast request is intercepted by a blocking message.

If the processor 106 contains a modified (M-state) copy of the data associated with the address, the processor returns a response to the processor 102, including a copy of the requested data. The cache line associated with the data at the processor 106 transitions from the M-state to the I-state. All the other processor responses are misses. Upon receiving these responses, the request engine 124 writes the data received from the processor 106 to a corresponding line 116 of the cache memory 114, and the MAF entry for the request can be removed from the MAF 126. Additionally, the state engine 122 sets the state of the cache line 116 associated with the data received from memory 110 to the D-state. Since the cache line 116 is now in the D-state, the response engine 128 of the processor 102 is capable of responding to requests for the data by sending a copy of the data to the requester. The particular type of response provided by the processor 102 can depend on factors, such as the type of request received by the processor and the cache state of the processor 102 when the request is received.

In a first case where the processor 102 writes the data, the state engine 122 transitions the cache line 116 from the D-state to the M-state. If source processor (e.g., processor 104) broadcasts a snoop request for the data (now M-state cache data), the target processor 102, being in the M-state for the requested data, provides a data response to the source processor 104. The other processors (e.g., processor 106) will provide non-data (miss) responses indicating that a valid copy of the requested data does not exist in the caches of those processors. The target processor 102, after providing the ownership data response, transitions its cache line from the M-state to the I-state. Upon receiving the data from the target processor 102, the source processor 104 transitions the cache line where the data resides to D-state. Thus, in this example, the data migrates from the target processor 102 to the source processor 104 without write-back to memory. From this point, further migration can occur in accordance with this paragraph, or migration may cease in accordance with the following paragraph.

In a second case where the processor 102 does not write the data, the processor maintains a cache line including the data in the D-state. The other processors (e.g., processor 106) provide non-data responses indicating that a valid copy of the requested data does not exist in the caches of those processors. Since the target processor 102 is in the D-state when the broadcast snoop request is received, the target processor responds by providing a shared data response to the source processor 104 and transitioning from the D-state to the O-state. The source processor 104 receives the requested data and places the requested data in the appropriate cache line in the source processor cache. The source processor 104 transitions this cache line from the I-state to the S-state and, thus, an up-to-date copy of the data is shared by both the source processor 104 (S-state) and the target processor 102 (O-state). The target processor 102 (while containing O-state data) can respond to requests for the data by providing shared copies of the data to the requesters. The recipients of the shared data will store the shared data in the S-state so that further migration of the data is precluded with subsequent requesting (source) processors. The O-state data will eventually be written-back to memory 110 when evicted from the target processor 102.

Figure 4:
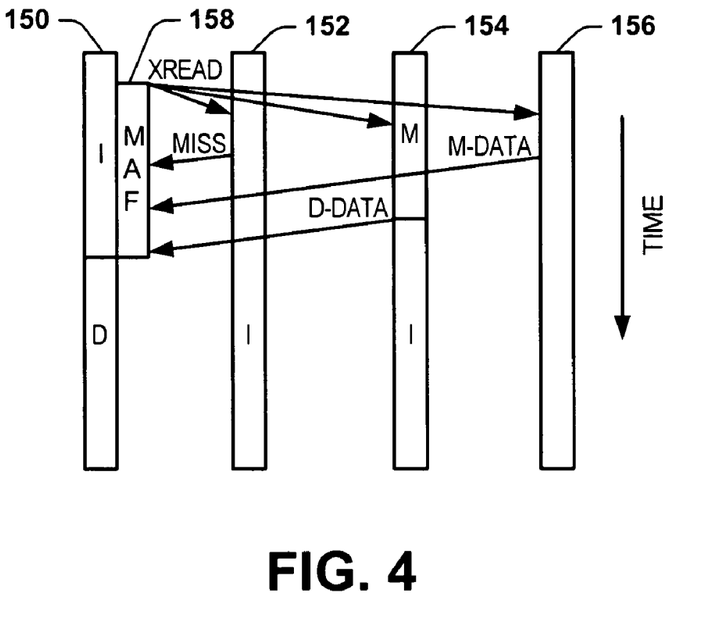
FIG. 4 depicts a first example scenario illustrating state transitions for a coherency protocol.
Figure 5:
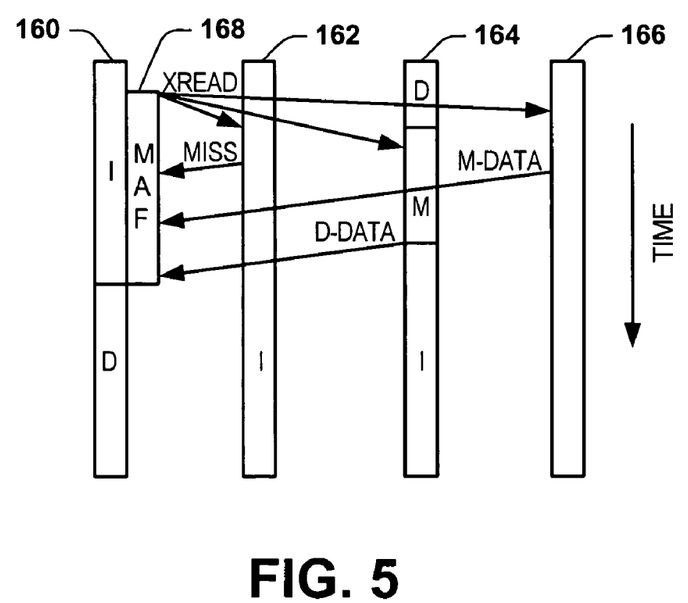
FIG. 5 depicts a second example scenario illustrating state transitions for a coherency protocol.
Figure 6:
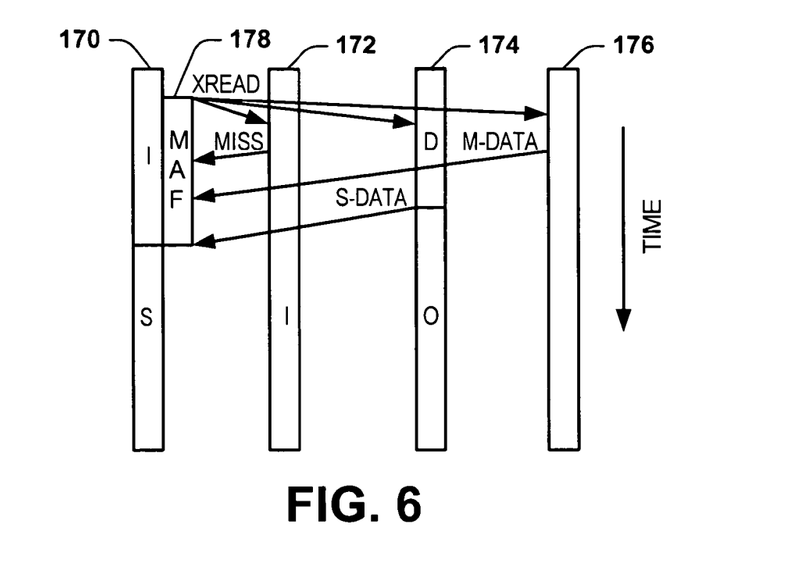
FIG. 6 depicts a third example scenario illustrating state transitions for a coherency protocol.

In view of the foregoing structural and functional features described above, certain methods that can be implemented using a coherency protocol will be better appreciated with reference to FIGS. 4–7. FIGS. 4–6 depict example scenarios that can be implemented in a multi-processor system employing a cache coherency protocol, as described herein. Each of the examples illustrates various interrelationships between requests and responses and state transitions that can occur for a given memory address in different memory devices or caches. In each of these examples, time flows in the direction of an arrow labeled "TIME." Those skilled in the art may appreciate various other cases that can be implemented using the coherency protocols described herein.

FIG. 4 illustrates a network that includes a requester or source node 150, target nodes 152 and 154 and a home node 156. Initially, nodes 150 and 152 are in an I-state for a particular cache line, the node 154 is in the M-state for the cache line, and the home node 156 contains a memory copy of the data associated with the cache line. Thus, the node 154 contains the most up-to-date copy of the data in the network. In this example, the node 150 is a source node that allocates a MAF entry 158 for the data being requested and sends a source broadcast read request to the other nodes 152, 154, and 156 (e.g., a broadcast read line code request or a broadcast read line data request). The node 152 returns a MISS response, indicating that the node does not contain a valid copy of data for the address identified in the request. The node 154 returns an ownership data (D-DATA) response, indicating that the node contains the most up-to-date copy of the data. The home node 156 for the data returns a copy of the requested data (M-DATA) from memory to the source node 150. After receiving the responses from all other nodes, the source node 150 transitions from the I-state to the D-state. The D-DATA can override the M-DATA provided by the home node 156 since the D-DATA may be more up-to-date than memory. The node 154 transitions to the I-state. The most up-to-date copy of the data has thus migrated from the target node 154 to the source node 150.

FIG. 5 depicts another example case that may occur using a broadcast-based coherency protocol in a network that includes a source node 160, target nodes 162 and 164 and a home node 166. As an example, the nodes 160 and 162 are initially in the I-state for the given cache line and the node 164 is in the D-state. The source node 160 allocates a MAF entry 168 and issues a source broadcast snoop to the other nodes 162, 164, and 166. Node 162, being in the I-state, returns a MISS response. The target node 164 transitions to the M-state 164 prior to receiving the XREAD request from the source node, such as in connection writing the data. The target node 164 provides an ownership data (D-DATA) response to the source node 160, and thereafter transitions from the M-state to the I-state. The home node 166 returns M-DATA to the source node 160. After receiving the responses from all other nodes, the source node 160 accepts the D-DATA over the M-DATA, and transitions from the I-state to the D-state. The most up-to-date copy of the data has thus migrated from the target node 164 to the source node 160 without write-back to the home node 166.

FIG. 6 depicts another example case that may occur using a broadcast-based coherency protocol in a network that includes a source node 170, target nodes 172 and 174 and a home node 176. As an example, the nodes 170 and 172 are initially in the I-state for the given cache line and the node 174 is in the D-state. The source node 170 allocates a MAF entry 178 and issues a source broadcast snoop requesting read-only data from the other nodes 172, 174, and 176. Node 172', being in the I-state, returns a MISS response. The target node 174 provides a shared S-DATA response to the source node 170, and transitions from the D-state to the O-state. The home node 176 returns M-DATA to the source node 170. The source node 170 accepts the D-DATA over the M-DATA because the D-data may be more up-to-date than the M-data. The source node transitions from the I-state to the S-state. As a result, the data, which may be more up-to-date than the home node 176, is thus shared by the target node 174 and the source node 170. The target node 174, while in the O-state, can respond to additional read-only requests for the data by providing shared copies of the data. The recipients of the shared data, being in the S-state for such data, will be unable to migrate the data. As a result, the ordering point for the requested data will thus remain at the target node 174 until the data is displaced, which displacement will require the target node 174 updating the home node 176.

Figure 7:
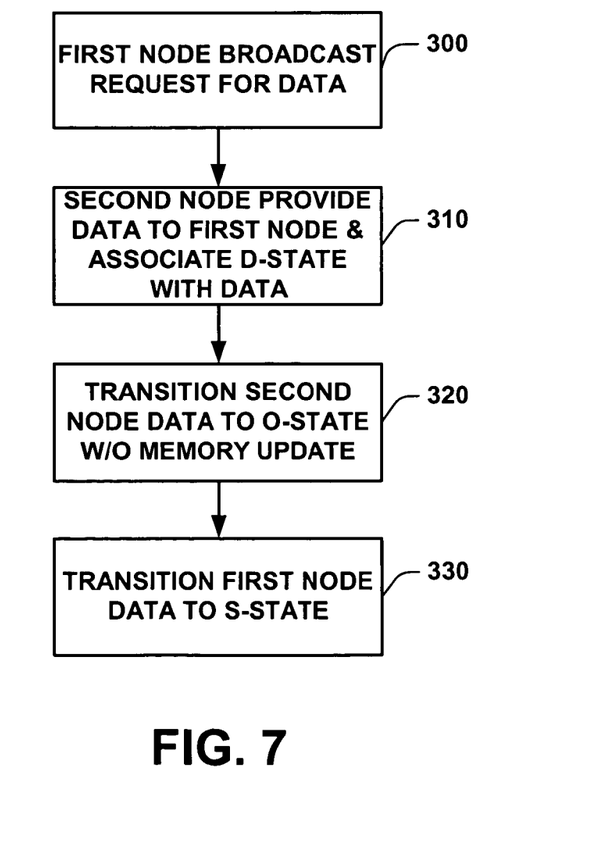
FIG. 7 depicts a flow diagram illustrating a method.

FIG. 7 depicts a method that includes broadcasting a request for data from a first node to other nodes of an associated system, as shown at 300. The method also includes responding to the request, at 310, by providing the data from a second node that includes the data, the second node having a D-state associated with the data. The method also includes transitioning the state associated with the data at the second node, as shown at 320, from the D-state to an O-state data without updating memory. The method further includes transitioning the state associated with the data at the first node to an S-state, as shown at 330.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system comprising:
    a first node including data having an associated dirty (D) state; and
    a second node operative to provide a source broadcast requesting the data, the first node being operative in response to the source broadcast to provide the data to the second node and to transition the state associated with the data at the first node from the D-state to an owner (O) state without concurrently updating memory, a shared (S) state being associated with the data at the second node.

2. The system of claim 1, wherein the first node is operative to transition the state associated with the data at the first node from the D-state to a modified (M) state in connection with writing the data to the first node prior to receiving the source broadcast from the second node.

3. The system of claim 2, wherein the first node is operative in response to the source broadcast to provide the data to the second node and transition the state associated with the data at the first node from the M-state to an invalid state without updating the memory, a D-state being associated with the data at the second node in response to receiving the data from the first node.

4. The system of claim 3, wherein the data at the second node having an associated D-state is available for migration to other nodes.

5. The system of claim 1, wherein the system further comprises another node that includes the data having an associated modified (M) state associated with the data prior to the first node including the data, the data migrating from the another node to the first node in response to the first node providing a source broadcast read request for the data, the data having the associated D-state in the first node in response to the data migrating from the another node to the first node.

6. The system of claim 5, wherein the another node having the data in the associated M-state transitions from the M-state to an invalid state without updating memory after providing the data to the first node.

7. The system of claim 1, wherein further migration of the data from the second node is precluded.

8. The system of claim 1, further comprising at least one other node that provides a non-data response in response to the source broadcast request from the second node indicating that the at least one other node does not have a valid copy of the data requested by the second node.

9. The system of claim 1, wherein the first node defines a first processor and the second node defines a second processor, the first and second processors each having an associated cache that comprises a plurality of cache lines, each cache line having a respective tag address that identifies associated data and each cache line having state information that indicates a state of the associated data for the respective cache line, the first and second processors being capable of communicating with each other and with a system memory via an interconnect.

10. The system of claim 9, further comprising a first cache controller associated with the first processor and a second cache controller associated with the second processor, the first cache controller being operative to manage data requests and responses for the associated cache of the first processor, the first cache controller effecting state transitions associated with the data in the associated cache of the first processor based on the data requests and responses for the associated cache of the first processor, the second cache controller being operative to manage data requests and responses for the associated cache of the second processor, the second cache controller effecting state transitions associated with the data in the associated cache of the second processor based on the data requests and responses for the associated cache of the second processor.

11. The system of claim 9, wherein the system implements a hybrid cache coherency protocol wherein each of the first and second processors employs a source broadcast-based protocol to issue a request for the data and provide responses for the data, and employs an associated forward progress protocol to reissue a request for the data in response to the request failing in the source broadcast protocol.

12. A multiprocessor network comprising:
    memory for storing data;
    a plurality of processor nodes in communication with each other and with the memory;
    a first processor node of the plurality of processor nodes including data in a cache line having an associated dirty state; and
    a second processor node of the plurality of processor nodes operative to provide a source broadcast read request to obtain the data;
    the first processor node being programmed to respond to the source broadcast read request of the second processor node by providing a shared data response to the second processor node and transitioning the data in the cache line from the dirty state to an owner state without concurrently updating the memory with the data, the data being stored in a cache line at the second processor node associated with a shared state.

13. The network of claim 12, wherein the first processor node is further programmed to transition the state associated with the data in the cache line of the first processor node from the dirty state to a modified state in connection with writing the data at the first processor node.

14. The network of claim 13, wherein the first processor node is operative while in the modified state to respond to a source broadcast read request for the data from a requester node by providing an ownership data response to the requester and to invalidate the modified data at the first processor node without updating the memory, the data being associated with a given address at the requester and having an associated dirty state in response to receiving the ownership data response from the first processor node.

15. The network of claim 12, wherein the first processor node is operative to receive the data and have an associated dirty state in response to the first processor providing a source broadcast requesting the data, the dirty data at the first processor node being provided by a processor node including the data and having a modified state associated with the data.

16. The network of claim 14, further comprising a third processor node that provides the data to the first processor node prior to the first processor node including the data in the cache line in the dirty state, the third processor node including the data in a modified state and providing an ownership data response to the first processor node such that the first processor node includes the data in the cache line in the associated dirty state, the third processor node transitioning the data in the cache line from the dirty state to an invalid state without updating the memory after providing the ownership data response to the first processor node.

17. The network of claim 12, wherein the network implements hybrid cache coherency protocol that employs a source broadcast protocol to process manage source broadcast requests provided by nodes within the network and, if a request fails, the network transfers to an associated forward progress protocol.

18. The network of claim 17, wherein the forward progress protocol comprises a directory-based protocol.

19. A computer system comprising:
a source processor having an associated cache, the source processor operative to issue a source broadcast request for data;
memory storing the data; and
a target processor having an associated cache with a cache line that includes the data, the cache line having an associated dirty (D) state, the target processor being programmed to (i) when not writing the data in the cache line of the target processor, respond to the source broadcast request by providing a shared data response to the source processor and by transitioning the state of the data in the cache line from the D-state to an owner (O) state without concurrently updating the memory, and (ii) programmed to transition the state of the data in the cache line from the D-state to a modified (M) state in connection with writing the data in the cache line of the target processor, and the first processor node being operative while in the M-state to respond to the source broadcast request by providing an ownership data response to the another processor node and by transitioning the state of the data in the cache line from the M-state to an invalid (I) state without updating the memory.

20. The computer system of claim 19, wherein the source processor further comprises a cache having a cache line for storing the data, the source processor storing the data in the cache line of the source processor in a shared state in response to receiving the shared data response from the target processor.

21. The computer system of claim 19, wherein the source processor further comprises a cache having a cache line for storing the data, the source processor storing the data in the cache line of the source processor in the D-state in response to receiving the ownership data response from the target processor.

22. The computer system of claim 19, further comprising a third processor having an associated cache and a cache line that includes the data and has an associated M-state prior to the target processor storing the data in the cache line in the D-state, the third processor being operative to provide an ownership data response to the target processor in response to a source broadcast read request from the target processor for the data and to transition the data in the cache line of the third processor from the M-state to the I-state, the data being placed in the cache line of the target processor cache in the D-state.

23. The computer system of claim 19, wherein the computer system implements hybrid cache coherency protocol that employs a source broadcast protocol that defines rules for processing broadcast requests provided by processors within the system, if a request fails using the source broadcast protocol, the system transfers to an associated forward progress directory-based protocol.

24. A system comprising:
means for broadcasting from a first node a request for data;
means for providing the data from a second node to the first node, the data at the second node having an associated dirty (D) state, a shared (S) state being associated with the data at the first node in response to the first node receiving the data from the second node; and
means for transitioning the state associated with the data at the second node from the D-state to an owner (O) state without concurrently updating memory of the system.

25. The system of claim 24, further comprising:
means for transitioning the data in the associated cache line at the second node from the D-state to a modified (M) state to permit the second node to write the data in an associated cache line at the second node;
means for providing a response from the second node to the first node that includes the data and for invalidating the data at the second node without updating memory; and
means for associating a D-state with the data at the first node in response to receiving the response from the second node.

26. The system of claim 24, further comprising means for providing the data from another node to the second node, the D-state being associated with the data at the second node in response to the second node receiving the data from the another node.

27. The system of claim 26, wherein the another node includes the data in modified (M) state, the system further comprising means for transitioning the state associated with the data at the another node from the M-state to an invalid state without writing-back to memory after the another node provides the data to the second node.

28. A method comprising:
broadcasting a request for data from a first node to other nodes of an associated system;
transitioning a state associated with the data at a second node from a dirty (D) state to an owner (O) state data without concurrently updating memory if the second node does not require to modify the data;
responding to the request broadcast from the first node by providing a response from the second node that includes a shared copy of the data; and
transitioning the state associated with the data at the first node to a shared (S) state in response to receiving the response from the second node.

29. The method of claim 28, further comprising:

obtaining permission for the second node to write the data to a cache line at the second node;

transitioning the state associated with the data at the cache line of second node to a modified (M) state;

providing the response from the second node to the first node;

transitioning the state associated with the data at a cache line of the first node to the D-state; and invalidating the data at the cache line of second node without updating memory.

30. The method of claim 28, wherein the associated system defines a multiprocessor system and the first and second nodes comprises processors in the multiprocessor system, the method further comprising:

employing a source broadcast protocol that defines rules for processing broadcast requests provided by the processors and the memory within the multiprocessor system; and reissuing a given request using an associated forward progress protocol if the given request fails while employing the source broadcast protocol.

31. A computer system comprising a cache coherency protocol that is operative to permit read migration of data to a cache associated with a source processor from a cache associated with a target processor when the data is written to the cache associated with the target processor, the protocol being further operative to prevent future read migration of the data to the cache associated with the source processor from the cache associated with the target processor when the data is not written to the cache associated with the target processor.

* * * * *

UNITED STATES PATENT AND TRADEMARK OFFICE
CERTIFICATE OF CORRECTION

| | | |
|---|---|---|
| PATENT NO. | : 7,143,245 B2 | Page 1 of 1 |
| APPLICATION NO. | : 10/761044 | |
| DATED | : November 28, 2006 | |
| INVENTOR(S) | : Gregory Edward Tierney et al. | |

It is certified that error appears in the above-identified patent and that said Letters Patent is hereby corrected as shown below:

In column 16, line 55, delete "172'" and insert -- 172 --, therefor.

Signed and Sealed this

Twenty-third Day of December, 2008

JON W. DUDAS
*Director of the United States Patent and Trademark Office*